(12) United States Patent
Älveby et al.

(10) Patent No.: US 6,722,310 B1
(45) Date of Patent: Apr. 20, 2004

(54) TEATCUP LINER, A TEATCUP AND A MILKING MEMBER

(75) Inventors: Nils Älveby, Stockholm (SE); Jan Kassibrahim, Norsborg (SE); Viktoria Noresson, Stockholm (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/980,294

(22) PCT Filed: Jun. 9, 2000

(86) PCT No.: PCT/SE00/01210
§ 371 (c)(1),
(2), (4) Date: Nov. 29, 2001

(87) PCT Pub. No.: WO00/76299
PCT Pub. Date: Dec. 21, 2000

(30) Foreign Application Priority Data

Jun. 10, 1999 (SE) .............................................. 9902182

(51) Int. Cl.⁷ ................................. A01J 5/04; A01J 5/16
(52) U.S. Cl. .................................. 119/14.47; 119/14.49
(58) Field of Search ........................... 119/14.47, 14.48, 119/14.49, 14.51

(56) References Cited

U.S. PATENT DOCUMENTS

| | | | |
|---|---|---|---|
| 1,896,321 A | | 2/1933 | Maes |
| 1,955,810 A | * | 4/1934 | Hodsdon ................. 119/14.49 |
| 2,574,063 A | * | 11/1951 | Richwine ................. 119/14.49 |
| 2,694,379 A | | 11/1954 | Hein |
| 3,474,760 A | * | 10/1969 | Siddall et al. ........... 119/14.49 |
| 3,643,630 A | | 2/1972 | Duncan |
| 3,973,521 A | * | 8/1976 | Duncan ................... 119/14.47 |
| 4,869,205 A | | 9/1989 | Larson |
| 4,936,254 A | * | 6/1990 | Marshall ................. 119/14.47 |
| 5,224,442 A | | 7/1993 | Davies |
| 5,317,988 A | * | 6/1994 | Hoefelmayr et al. ..... 119/14.47 |
| 5,572,947 A | * | 11/1996 | Larson et al. ............ 119/14.51 |
| 5,666,904 A | * | 9/1997 | Grindal .................... 119/14.02 |
| 6,164,243 A | * | 12/2000 | Larson ..................... 119/14.49 |

FOREIGN PATENT DOCUMENTS

| | | | | |
|---|---|---|---|---|
| DE | 4419948 | | 6/1995 | |
| JP | 408112046 A | * | 5/1996 | ............. A01J/5/04 |

* cited by examiner

Primary Examiner—Son T. Nguyen
(74) Attorney, Agent, or Firm—Hovey Williams LLP

(57) ABSTRACT

The invention refers to a teatcup liner, a teatcup and a milking member. The teatcup liner is mountable in a teatcup shell, having a first end and a second end, such that in the mounted state it extends through the teatcup she 1 and forms an inner space for receiving a teat and an outer space between the teatcup shell and the teatcup liner. The teatcup liner also includes a grip area which has a non-circular shape in cross-section and is arranged to be gripped by a grip portion of the teatcup shell such that the grip area is surrounded by and abuts the grip portion. The teatcup liner has a connection portion for connection to a teatcup claw and includes structure for defining a rotary position for the teatcup liner in relation to the teatcup claw.

14 Claims, 3 Drawing Sheets

TEATCUP LINER, A TEATCUP AND A MILKING MEMBER

BACKGROUND OF THE INVENTION AND PRIOR ART

The present invention refers to a teatcup liner intended to be mounted in a teatcup shell, which has a first end and a second end, in such a manner that it in a mounted state extends through the teatcup shell and forms an inner space arranged to receive a teat and a outer space between the teatcup shell and the teatcup liner, wherein the teatcup liner includes an opening, which is intended to permit the introducing of said teat into said inner space and which, in the mounted state, is arranged to be located at the first end, and wherein the teatcup liner includes a grip area, which is arranged to be gripped by a grip portion of the teatcup shell in such a manner that the grip area is surrounded by and abuts the grip portion in the mounted state, wherein the grip area, seen in a cross-section, has a non-circular shape. The invention also refers to teatcup and a milking member.

Such a teatcup liner is disclosed in US-A-5,244,422. This document discloses a teatcup having a triangular grip portion for gripping a corresponding triangular grip area of the teatcup liner.

Certain such teatcup liners, which extend through a teatcup shell and connect directly to a teatcup claw, are intended to be mounted to an inlet member of the teatcup claw in a determined rotary position in relation to the teatcup claw. This is so to, for instance, teatcup liners having an asymmetrical shape seen in the longitudinal axis of the teatcup liner. Furthermore, the teatcup shell may be provided with a connection nipple for a short pulse conduit, which extends to a distributing member of the teat cup claw. In order to ensure that the pulse conduits are not deformed in such a way that the flow therethrough is hindered, it is advantageous to position the teatcup shells in a determined rotary position in relation to the teatcup claw. It is important that the teatcup has an optimal movability, i.e. the pulse hoses are to be provided in such a way that the load on the teats is as small as possible. Furthermore, the vacuum closing may not be prevented, i.e. the teatcup is to hang straightly downwardly when the milking member is not used.

SUMMARY OF THE INVENTION

The object of the present invention is to remedy the problems mentioned above. In particular, it is aimed at a teatcup liner, a teatcup and a milking member, respectively, which ensures a proper orientation of the teatcup liner in relation to the teatcup shell and the teatcup claw.

This object is obtained by the teatcup liner initially defined, which is characterised in that the teatcup liner includes a connection portion, which is arranged to enable the connection of the teatcup liner to a teatcup claw and which includes means arranged to define a rotary position for the teatcup liner in relation to the teatcup claw.

By the defined cross-sectional shape of the grip area of the teatcup liner, the possibility is obtained to mount the teatcup liner in one or possibly several determined rotary positions in relation to the teatcup shell in such a way that the teatcup liner can not be rotated in relation to the teatcup shell. The non-circular shape may be realised in many different ways and may for instance include a circular shape along a main part of the periphery with a projecting portion, or any other irregularity, along the remaining part of the periphery. Thereby, the grip portion of the teatcup shell may be formed by an opening, which is provided at the second end and which has a non-circular shape, wherein the non-circular cross-sectional shape of the grip area may correspond to the shape of the grip portion, wherein the teatcup liner is non-rotatable in relation to the teatcup shell in the mounted state. Furthermore, a user will always mount both the teatcup liner and the teatcup shell in a predetermined position in relation to each other and in relation to the teatcup claw of a milking member.

According to an embodiment of the invention, said means includes a chamfer of the connection portion, which is arranged to abut a projecting portion of the teatcup claw.

According to a further embodiment of the invention, the grip area includes a surface, which extends around the teatcup liner and which at least has a tangent which is substantially parallel to the longitudinal axis of the teatcup liner. Thereby, the grip area may be surrounded by two projection portions, which extend around the teatcup liner and which define the actual position of the teatcup liner in the teatcup shell in the mounted state.

According to a further embodiment of invention, the cross sectional shape of the grip area is such that the teatcup liner is positionable in at the most two rotary positions in relation to the teatcup shell in the mounted state. By such a defined rotary position or two such defined rotary positions, which are located at a distance of 180° from each other, it is possible for a user to always orientate the teatcup liner in a proper manner in the teatcup shell. Thereby, the cross-sectionaly shape of the grip area may advantageously be oval.

According to a further embodiment of the invention, the teatcup liner includes a connection portion, which is arranged to connect the teatcup liner to the first end of a teatcup shell in the mounted state and which includes means arranged to define at the most two possible rotary positions for the teatcup liner in relation to the teatcup shell in the mounted state. Since the teatcup liner in such a way may only be in one or possibly several determined rotary positions, it may be ensured that the teatcup liner extends in a proper way through the teatcup shell between the first end and the second end, i.e. the teatcup liner is not permitted to rotate, which may have the result that the teatcup liner does not open and close in a proper manner.

The object is also obtained by the initially defined teatcup and initially defined milking member, which are characterised in that the teatcup liner includes a connection portion, which is arranged to enable the connection of the teacup liner to the teatcup claw and which includes means arranged to define a rotary position for the teatcup liner in relation to the teatcup claw.

BRIEF DESCRIPTION OF THE DRAWINGS

The present invention is now to be explained more closely by means of an embodiment, described by way of example, and with reference to the drawings attached, in which FIG. 1 discloses a longitudinal section through a teatcip liner according to an embodiment of the invention, FIG. 2 discloses a cross-section through a grip portion of the teatcup liner in FIG. 1 along the line II—II, FIG. 3 discloses a cross-section through the teatcup liner in FIG. 1 along the line III—III, FIG. 4 discloses a longitudinal section through a teatcup, which has a teatcup liner according to FIG. 1 and which is connected to a teatcup claw, and FIGS. 5–7 discloses cross-sections through the grip portion of the teat liner according to different embodiments of the invention.

DETAILED DESCRIPTION OF AN EMBODIMENT OF THE INVENTION

Figure 1:
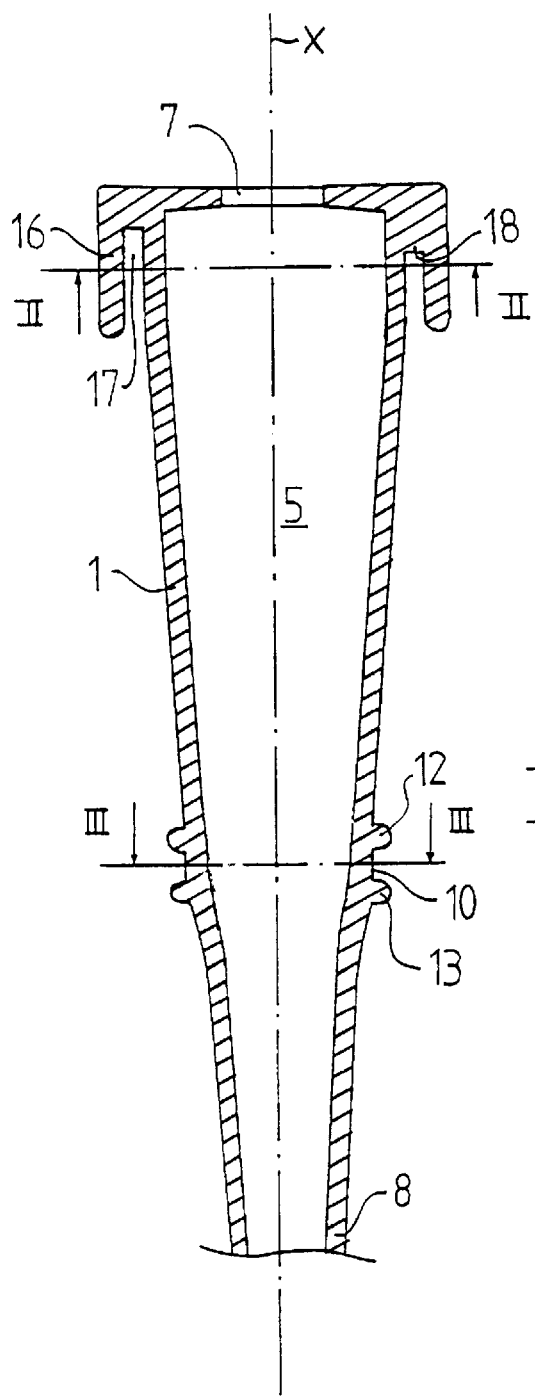
Figure 4:
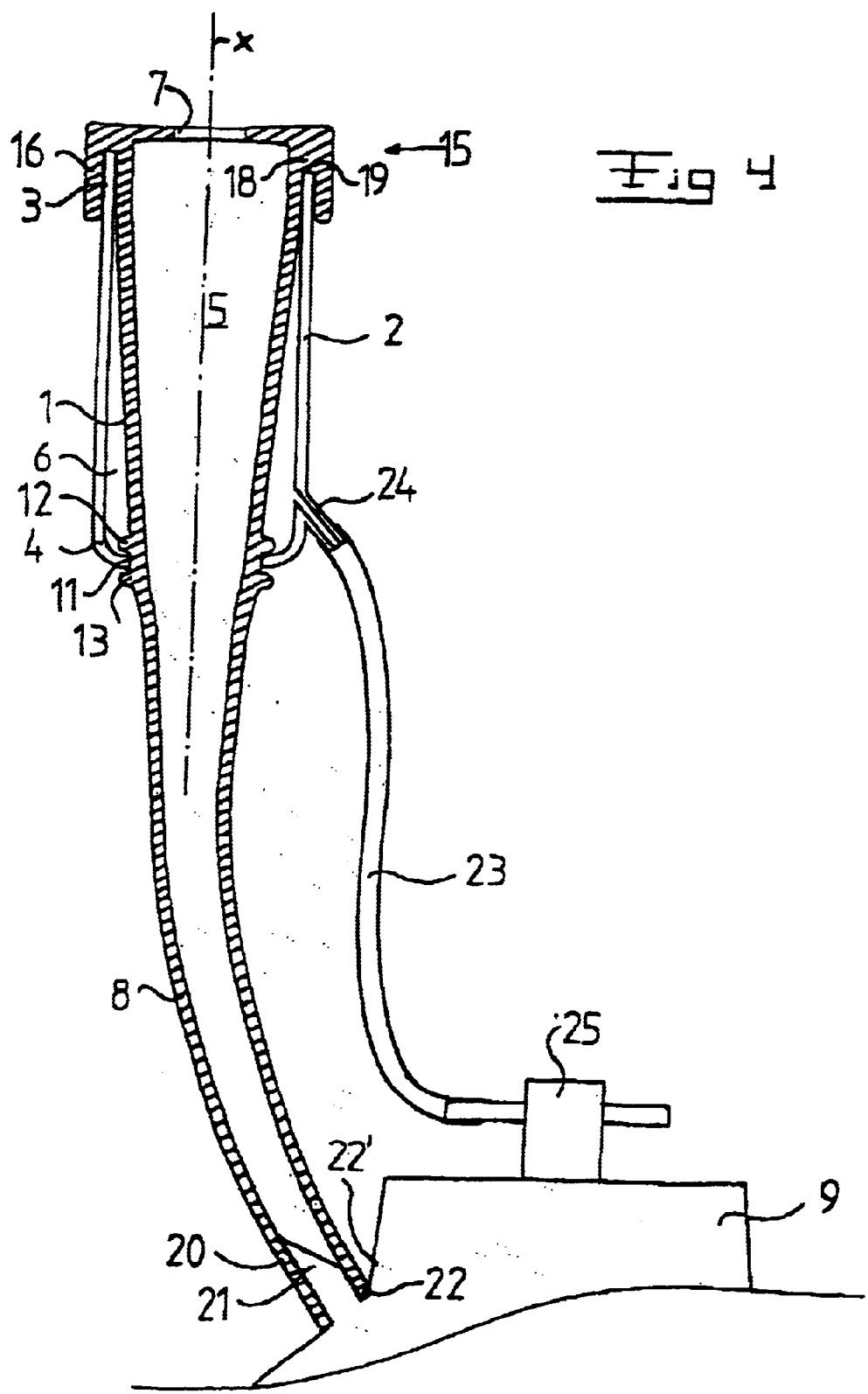

FIG. 1 discloses a teatcup liner 1, which is intended to be mounted in a teatcup shell 2, see FIG. 4, and together with the teatcup shell 2 form a teatcup. The teatcup shell 2 has a first upper end 3 and a second lower end 4. The teatcup liner 1 is intended to be mounted in the teatcup shell 2 in such a way that it extends through the teatcup shell 2 and forms an inner space 5, arranged to receive a teat, and an outer space 6, a so called pulsation chamber, between the teatcup shell 2 and the teatcup liner 1. The teatcup liner 1 has in a rest state a substantially straight extension with a longitudinal axis x. Furthermore, the teatcup liner 1 includes an opening 7, which is located in an upper part of the teatcup liner 1, i.e. the end which is connected to the first end 3 of the teatcup shell 2. As used in this application, the term "upper" is intended to mean the end which is located upwardly when the teatcup liner 1 is attached to a teat of the animal to be milked, i.e., an active state of use. The opening 7 is intended to permit introducing of a teat into the inner space 5. The inner space 5 continues in a milk conduit 8, which is connected to a teatcup claw 9, see FIG. 4. Consequently, the milk conduit 8 is arranged to transport the milk from the inner space 5 to the teatcup claw 9.

The teatcup liner 1 includes a grip area 10. The grip area 10 includes a surface, which extends around the teatcup liner 1 and is substantially parallel to the longitudinal axis x. It is to be noted here that even if the grip area 10 in the embodiment disclosed in FIG. 1 has the axial extension, the grip area 10 may be formed by a surface, which, seen in an axial longitudinal section, has a concave shape and thus has merely one tangent that is substantially parallel to the longitudinal axis x. The grip area 10 is arranged to be gripped by a grip portion 11 of the second lower end 4 of the teatcup shell, when the teatcup liner is mounted in the teatcup shell 2 in such a way that the grip area 10 is surrounded by and abuts the grip portion 11. The grip area 10 is surrounded and limited in axial direction by two projection portions 12, 13, which extend around the teatcup liner 1 and which are arranged to be located at a respective side of the grip portion 11 of the teatcup shell 2 when the teatcup liner 1 is mounted in the teatcup shell 2. The projecting portions 12 and 13 thus define the axial position of the teatcup liner 1 in the teatcup shell 2.

Figure 3:
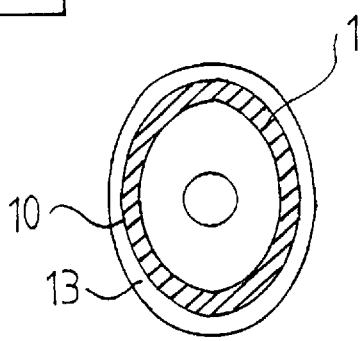

In order to prevent the teatcup liner 1 from rotating in the teatcup shell 2, the grip area 10 has a non-circular shape seen in a radial cross-section, see FIG. 3. As appears from FIG. 3, the grip area 10 is, according to this embodiment, the grip portion 11 of the teatcup shell 2 is formed by an opening, which has a corresponding oval shape, which means that the teatcup liner 1 may take two determined rotary positions in relation to the teatcup shell 2, which positions are displaced 180° from each other.

Figure 5:
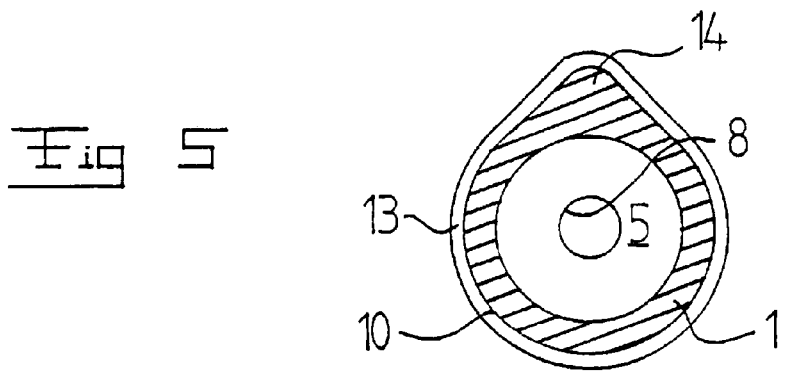
Figure 6:
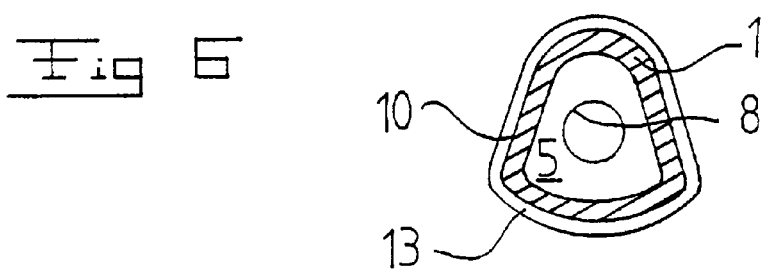
Figure 7:
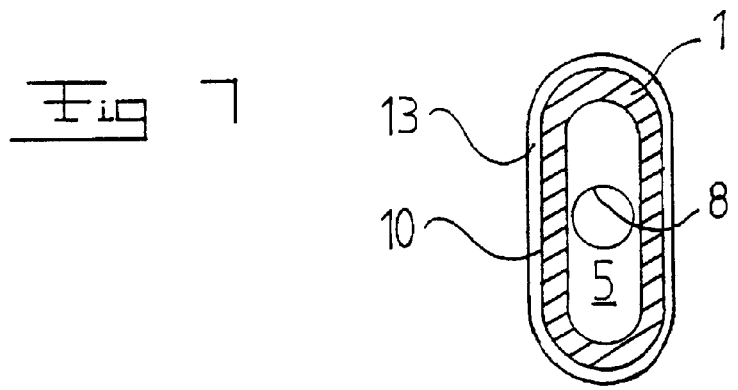

FIGS. 5–7 discloses three other possible shapes of the grip area 10 of the teatcup liner 1. In FIG. 5, the grip area 10 has a circular shape around a major part of the periphery and a projecting portion 14 along a minor part of the periphery. The grip portion 11 of the teatcup shell 2 has a corresponding shape, which means that the teatcup liner 1 only may be mounted in a predetermined rotary position in relation to the teatcup shell 2.

FIG. 6 discloses a shape of the grip area 10, which is similar to an isosceles triangle and which permits only one rotary position to the teatcup liner 1 in relation to the teatcup shell 2. FIG. 7 discloses an oblong shape permitting two rotary positions to the teatcup liner 1 in relation to the teatcup shell 2. Also other shapes of the grip area 10 than the ones disclosed are possible within the scope of the invention.

Figure 2:
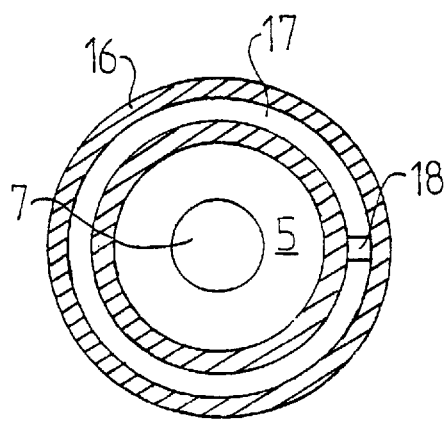

The teatcup liner 1 also includes a connecting portion 15, which is arranged to connect the teatcup liner 1 to the first upper end of the teatcup shell 2 when the teatcup liner 1 is mounted in a teatcup shell 2, see FIG. 4. The connecting portion includes a collar or flange 16, which has a radial extension and an axial extension in such a way that an annular recess 17 between the collar 16 and the outer surface of the teatcup liner 1 is formed. Furthermore, the connecting portion 15 includes means arranged to define a fixed determined rotary position for the teatcup liner 1 in relation to the teatcup shell 2 in the upper end 3 when the teatcup liner 1 is mounted in the teatcup shell 2. In the embodiment disclosed in FIGS. 1 and 2, this means includes a bridge 18 of material, which extends in the recess 17 between the collar 16 and the outer wall of the teatcup liner 1. The bridge of material 18 is arranged to engage a corresponding recess, which extends from the upper end 3 of the teatcup shell 2. It is to be noted that the connecting portion 15 may include two such bridges of material 18 and recesses 19 for permitting two rotary positions of the teatcup liner 1 in relation to the teatcup shell 2. By giving the teatcup liner 1 a fixed rotary position both in the upper end 3 and the lower end of the teatcup shell 2, it is ensured that the teatcup liner 1 always extends through the teatcup shell 2 in such a way that the teatcup liner is not twisted.

The milk conduit 8 of the teatcup liner 1 includes an outer end which has a connection portion 20, which connection portion is arranged to enable the connection of the teatcup liner to the teatcup claw, see FIG. 4. In the embodiment disclosed, the connection portion 20 is provided on a connection nipple 21 of the teatcup claw 9. Due to different circumstances, for instance the use of teatcup liners having a nonsymmetrical shape or the space available at the teatcup claw 9, it is important that the teatcup liner 1 takes a determined rotary position also in relation to the pipe nipple 21. This rotary position is defined in the embodiment disclosed by means of a chamfer 22 of the outer end of the connection portion 20. In the example disclosed, the chamfer 22 is arranged to abut a projecting portion 22' of the teatcup claw. The determined rotary position in relation to pipe nipple 21 may also be obtained in other ways, for instance via non-circular cross-sectional shapes. The connection portion 20 of the teatcup liner 1 may also be designed in such a way that it is introducable into an opening of the teatcup claw. In this case, the different cross-sectional shapes, exemplified in FIGS. 3, 5, 6 and 7, may advantageously be used for the connection portions 20 and said opening. FIG. 4 discloses also a pulse conduit 23, which extends from a connection nipple 24 of the teatcup shell 2 to a distributing member 25 of the teatcup claw 9. In order to obtain as simple and short pulse conduit 23 as possible, it is advantageous if the connection nipple 24 is located in a determined rotary position in relation to the distributing member 25. This may be achieved by fixed rotary positions, which are defined in accordance with the present invention.

The invention is not limited to the embodiment disclosed but may be varied and modified within the scope of the following claims.

What is claimed is:

1. A teatcup liner adapted for connection to a teatcup claw and to be mounted in a teatcup shell which has a first end and a second end in such a manner that the teatcup liner in a mounted state extends through the teatcup shell and forms an inner space arranged to receive a teat and an outer space between the teatcup shell and the teatcup liner, the teatcup liner comprising:

an opening which is adapted to permit the introducing of the teat into said inner space and which, in the mounted state, is arranged to be located at the first end;

a grip area which is arranged to be gripped by a grip portion of the teatcup shell in such a manner that the grip area is surrounded by and abuts the grip portion in the mounted state, wherein the grip area, seen in a cross-section, has a non-circular shape and whereby the teatcup liner is non-rotatable in relation to the teatcup shell in the mounted state; and a connection portion which is arranged to enable the connection of the teatcup liner to a teatcup claw and which includes means for defining a predetermined rotary position for the teatcup liner in relation to the teatcup claw.

2. A teatcup liner according to claim 1, wherein said means for defining a rotary position includes a chamfer of the connection portion which is arranged to abut a projecting portion of the teatcup claw.

3. A teatcup liner according to claim 1, wherein the grip portion of the teatcup shell is formed by an opening which is provided at the second end and which has a non-circular shape, wherein the non-circular cross-sectional shape of the grip area corresponds to the shape of the grip portion, wherein the teatcup liner is non-rotatable in relation to the teatcup shell in the mounted state.

4. A teatcup liner according to claim 1, wherein the grip area includes a surface which extends around the teatcup liner and which at least has a tangent which is substantially parallel to a longitudinal axis (x) of the teatcup liner.

5. A teatcup liner according to claim 4, wherein the grip area is surrounded by two projecting portions which extend around the teatcup liner and which define the axial position of the teatcup liner in the teatcup shell in the mounted state.

6. A teatcup liner according to claim 1, wherein the cross-sectional shape of the grip area is such that the teatcup liner is positionable in at most two rotary positions in relation to the teatcup shell in the mounted state.

7. A teatcup liner according to claim 1, wherein the cross-sectional shape of the grip area is oval.

8. A teatcup liner according to claim 1, wherein the teatcup liner includes a connecting portion which is arranged to connect the teatcup liner to the first end of the teatcup shell in the mounted state and which includes means arranged to define a maximum of two alternate rotary positions for the teatcup liner in relation to the teatcup shell in the mounted state.

9. A teatcup comprising:

a teatcup shell which has a first end and a second end and a grip portion; and a teatcup liner which in a mounted state extends through the teatcup shell and forms an inner space arranged to receive a teat and an outer space between the teatcup shell and the teatcup liner, wherein the teatcup liner includes an opening which is adapted to permit the introducing of the teat into the inner space and which in the mounted state is located at the first end and wherein the teatcup liner includes a grip area which is arranged to be gripped by said grip portion of the teatcup shell in such a manner that the grip area is surrounded by and abuts the grip portion in the mounted state, wherein the grip area, seen in a cross-section, has a non-circular shape, and wherein the teatcup liner includes a connection portion which is arranged to enable the connection of the teatcup liner to a teatcup claw and which includes means for defining a predetermined rotary position for the teatcup liner in relation to the teatcup claw.

10. A teatcup according to claim 9, wherein said means includes a chamfer of the connection portion which is arranged to abut a projecting portion of the teatcup claw.

11. A teatcup according to claim 9, wherein the grip portion of the teatcup shell is formed by an opening which is provided at the second end and has a non-circular shape corresponding to the non-circular cross-sectional shape of the grip area, wherein the teatcup liner is non-rotatable in relation to the teatcup shell in the mounted state.

12. A milking member comprising:

a teatcup claw; and at least one teatcup, wherein the teatcup includes a teatcup shell which has a first end and a second end, and a teatcup liner which in a mounted state extends through the teatcup shell and forms an inner space arranged to receive a teat and an outer space between the teatcup shell and the teatcup liner, wherein the teatcup liner includes an opening which is intended to permit the introducing of said teat into the inner space and which in the mounted state is located at the first end, and wherein the teatcup liner includes a grip area which is arranged to be gripped by a grip portion of the teatcup shell in such a manner that the grip area is surrounded by and abuts the grip portion in the mounted state, wherein the grip area, seen in a cross-section, has a non-circular shape, and wherein the teatcup liner includes a connection portion which is arranged to enable the connection of the teatcup liner to the teatcup claw and which includes means for defining a predetermined rotary position for the teatcup liner in relation to the teatcup claw.

13. A milking member according to claim 12, wherein said rotary position defining means includes a chamfer of the connection portion which is arranged to abut a projection portion of the teatcup claw.

14. A milking member according to claim 12, wherein the grip portion of the teatcup shell is formed by an opening, which is provided at the second end and has a non-circular shape corresponding to the non-circular cross-sectional shape of the grip area, wherein the teatcup liner is non-rotatable in relation to the teatcup shell in the mounted state.

* * * * *